United States Patent [19]
Koehn

[11] 3,735,816
[45] May 29, 1973

[54] ROD WEEDER DRIVE ASSEMBLY

[76] Inventor: Dale G. Koehn, Rural Route 1, Montezuma, Kans. 67867

[22] Filed: Feb. 1, 1971

[21] Appl. No.: 111,431

[52] U.S. Cl. ..................172/44, 172/125, 172/253
[51] Int. Cl. .............................................A01b 39/19
[58] Field of Search.......................172/44, 47, 253, 172/125

[56] References Cited

UNITED STATES PATENTS

| | | | |
|---|---|---|---|
| 3,283,830 | 11/1966 | Hamby | 172/44 |
| 3,430,702 | 3/1969 | Hamby et al. | 172/44 |
| 3,227,224 | 1/1966 | Morris | 172/44 |
| 3,576,213 | 4/1971 | Hall | 172/44 |
| 2,539,037 | 1/1951 | Shields | 172/44 |
| 2,892,504 | 6/1959 | Mombray | 172/44 |
| 2,596,270 | 5/1952 | Miller | 172/44 |
| 3,443,645 | 5/1969 | Edwards | 172/44 |
| 3,237,700 | 3/1966 | Hutchinson | 172/47 |

FOREIGN PATENTS OR APPLICATIONS 173,764  12/1960  Sweden..................172/47

Primary Examiner—Robert E. Pulfrey
Assistant Examiner—C. W. Hanor
Attorney—John H. Widdowson

[57] ABSTRACT

A drive assembly used with an implement having a rod weeder that is attachable to a tractor vehicle. The drive assembly is adapted to rotate the weeder rod of the rod weeder implement, and has a gearbox connectable with the power takeoff of the tractor by a main shaft, a second shaft connects the gearbox and a chain drive connected to the weeder rod contained in a strut mountable on a plow of the rod weeder.

1 Claim, 5 Drawing Figures

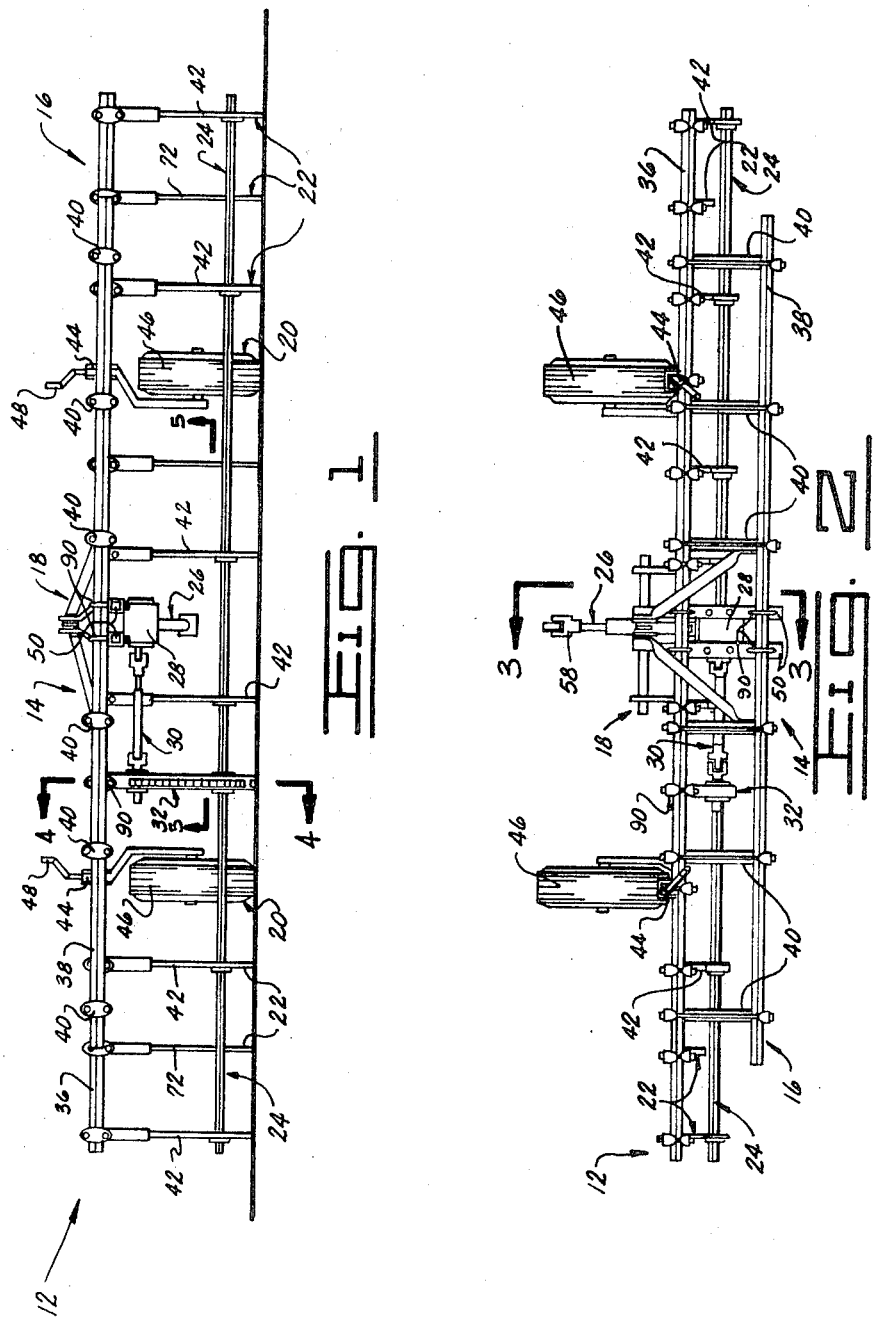

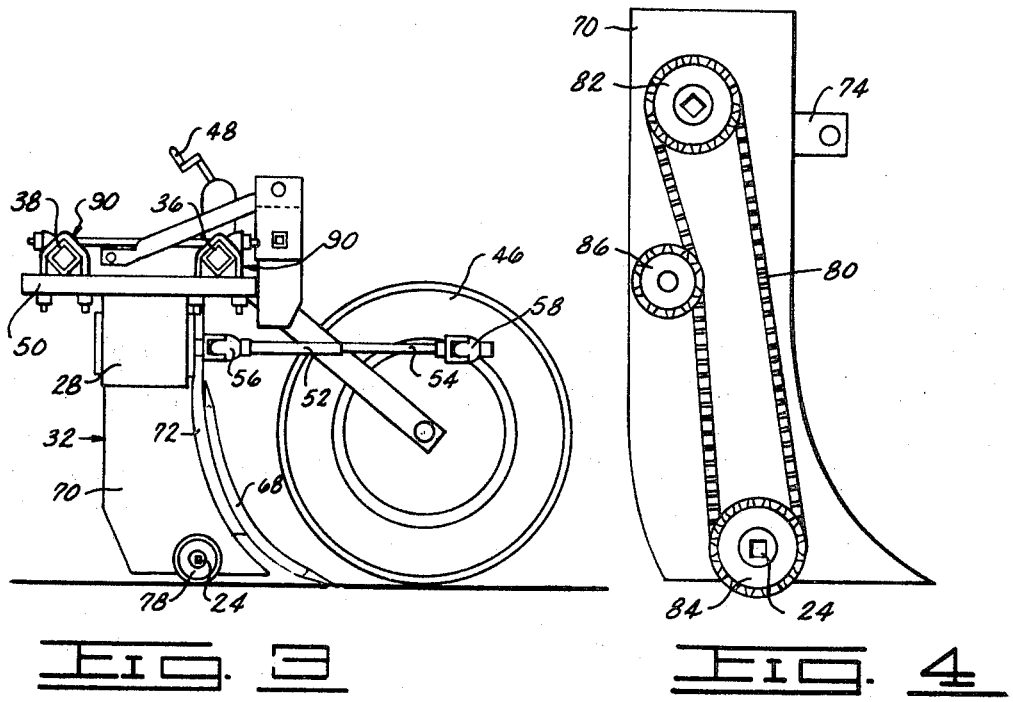
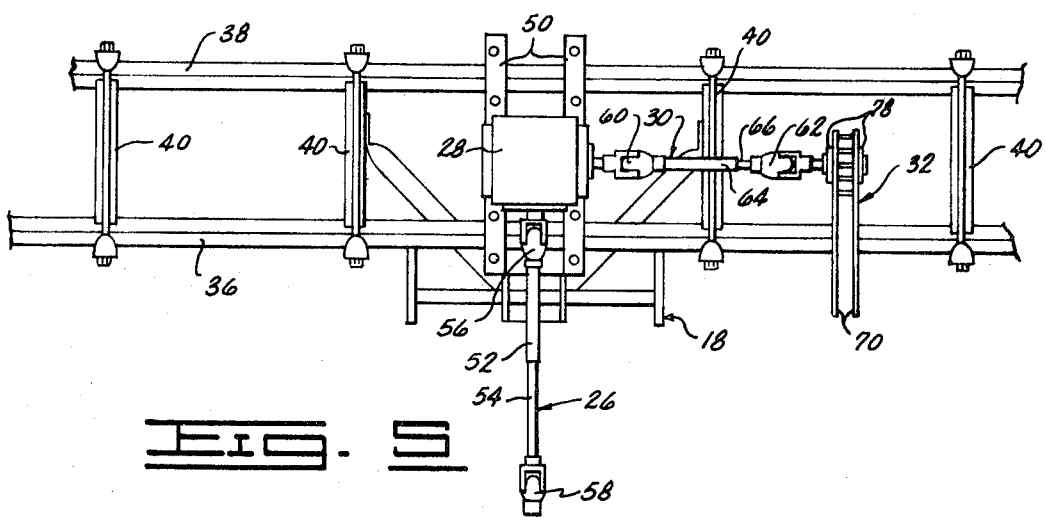

ROD WEEDER DRIVE ASSEMBLY

Numerous types of means are known in the prior art operable to drive the rotatable rod of a rod weeder implement. Some of these prior art drive devices have incorporated fluid motors connected to chain drives operable to rotate the weeder rod. These devices require the tractor vehicle to have an auxiliary hydraulic system, which many models do not have. Other prior art drive devices have geared devices connectable to the power takeoff of the tractor vehicle for operation of the rod weeder; this type device used either a chain drive and/or worm gear arrangement to drive the weeder rod. Although the power takeoff type drive device is easily adapted to use with most conventional tractor vehicles, the prior art devices have used a number of jointed drive shafts to route the power from the power takeoff to the gear box or whatever; these jointed shafts compensate for misalignment between the power takeoff and the gear box and allow the implement to be raised and lowered. In these prior art devices the multiply jointed driveshaft was necessary because not all tractor vehicles have the power take off shaft in the same position relative the vehicles' hitch, and the gear box or whatever was mounted in a fixed position on the rod weeder implement. These multiply jointed drive shafts are subject to much wear and vibration due to the number of segments thereof.

In one preferred specific embodiment of the herein described invention, a rod weeder drive assembly includes a substantially conventional rod weeder frame assembly; an adjustably mounted gear box assembly is connectable to the power takeoff by a single drive shaft assembly and by another single drive shaft assembly to a chain drive assembly operable to rotate the weeder rod. The rod weeder frame assembly has a transverse frame comprised of a plurality of elongated members with a plurality of plow shoes depending therefrom. The frame is supported on height adjustable wheel standards and has a standard three point hitch to attach the frame to a tractor vehicle. The gear box assembly is mounted to be transversely adjustable along the frame and so are the plow shoes. The main drive shaft assembly is adjustable in length and is attachable to the power takeoff of the tractor vehicle. The second shaft assembly is adjustable in length and connects the gear box assembly and the chain drive assembly. The chain drive assembly has a housing attached to the back of a plow holding tool bar partially enclosing the chain with the weeder rod and sprockets supported by bearing assemblies mounted on sides of the housing.

One object of the rod weeder drive assembly of this invention is to overcome the aforementioned disadvantages of the prior art devices.

Another object of the rod weeder drive assembly of this invention is to provide a drive assembly having a single extendable drive shaft easily couplable with the tractor vehicle's power takeoff assembly.

Still another object of the rod weeder drive assembly of this invention is to provide a drive assembly having a right angle gear box coupled by a single extendable shaft to a chain drive assembly operable to rotate the weeder rod.

Yet another object of the rod weeder drive assembly of this invention is to provide a drive assembly having a right angle gear box mounted on the frame of the rod weeder such that it is transversely adjustable thereon.

Yet an additional object of the rod weeder drive assembly of this invention is to provide a rod weeder drive assembly having a partially enclosed and open on the back chain drive assembly attached behind a plow holding tool bar with roller bearing assemblies to rotatably mount the chain drive sprockets and the weeder rod.

Various other objects, advantages, and features of the invention will become apparent to those skilled in the art from the following discussion, taken in conjunction with the accompanying drawings, in which:

FIG. 1 is a rear elevation view of the rod weeder implement and the drive assembly positioned with the plow shoes touching the ground;

FIG. 2 is a top plan view of the rod weeder and drive assembly shown in FIG. 1;

FIG. 3 is a cross-sectional view of the center portion of the rod weeder and drive assembly taken on line 3—3 of FIG. 2;

FIG. 4 is a cross-sectional view of the drive strut showing the chain drive assembly taken on line 4—4 of FIG. 1; and FIG. 5 is a bottom plan view of the center portion of the rod weeder taken on line 5—5 of FIG. 1.

The following is a discussion and description of the preferred specific embodiments of the rod weeder drive assembly of this invention, such being made with reference to the drawings, whereupon the same reference numerals are used to indicate the same or similar parts and/or structure. It is to be understood that such discussion and description is not to unduly limit the scope of the invention.

Referring to the drawings in detail and in particular to FIGS. 1 and 2 showing a conventionally styled rod weeder, generally indicated at 12, with the rod weeder drive assembly of this invention, generally indicated at 14. The rod weeder 12 has an elongated frame structure 16 with a standard type three-point hitch 18 and wheel assemblies 20 on the forward side and a plurality of plows 22 positioned below some of which are supporting the weeder rod 24. The rod weeder drive assembly 14 of this invention has a mainshaft 26 extending forward from the gear box 28, which is mounted with the rod weeder frame 16, a second shaft 30 connecting the gear box 28 and the drive strut 32 which houses the chain drive, which is used to rotate the weeder rod 24.

The rod weeder 14 shown in the drawings is of the conventional type and is well known in the prior art. The rod weeder frame 16 has transversely extending rectangular conduits 36 and 38 forming the forward and rear main members thereof which mount and support the other components of the rod weeder 12. The hitch 18 is positioned in the center portion of the frame 16 on the forward side and is attached to both the forward 36 and rear 38 frame conduits. Several lateral support members 40 connect the forward 36 and rear 38 frame conduits at several places along the frame 16 so as to hold the conduits in a substantially rigid and parallel relation. Positioned between the lateral members 40 are strut supports 42 which support the weeder rod 24 and function as tool holding bars; they are mounted on the forward frame conduit 36. The strut supports 42 have bearing assemblies on the lower end which mount the weeder rod 24 so it rotates about its elongated axis. The wheel assemblies 20 are mounted on the forward frame conduit 36 and have standards 44 supporting the wheels 46 which are used to adjust the height of the frame 16 and plows 22 to the ground. This height adjustment is done by screw type adjustments with hand cranks 48.

The rod weeder drive assembly 12 as shown with the rod weeder 12 has the gear box 28 mounted on a pair of lateral conduit support members 50 attached to the forward 36 and rear 38 frame conduits. The gear box 28 is preferrably a sealed unit and has the input and the output oriented at a right angle as shown. Input to the gear box 28 is by the mainshaft 26. The mainshaft 26 has two segments which are joined by an elongated splined joint and slide along one another so as to make it extendable to provide easy coupling to the tractor or operator vehicle. This extendable feature of the mainshaft 26 allows for length compensation when the rod weeder 12 is raised or lowered. Segments of the mainshaft 26 are an outer shaft portion 52 which comprises one end portion and an inner shaft portion 54 which comprises the other end portion. The shaft portions 52 and 54 are shaped and sized on the matching surfaces to freely slide along one another; in practice a substantially square cross-sectional shape has been found to work well. The outer shaft portion 52 is preferably permanently attached to the input of the gear box 28 by a universal joint coupling 56. The opposite end of the mainshaft 28 is the inner shaft portion 54; it has an easily disconnectable universal joint coupling 58 permanently attached to it adapted to be easily connected to and disconnected from power takeoff of the tractor or operator vehicle. Usually tractor or operator type vehicles have a short splined shaft extending from their rear which is rotated by the power takeoff; this shaft is used here to operate the rod weeder drive assembly 14 of this invention.

The rod weeder drive assembly 14 has the second shaft 30 coupled to the output of the gear box 28 by a universal joint 60 on one end, and it has another universal joint 62 on the other end connecting it to the drive strut 32 and chain drive assembly. The second shaft 30 is constructed similar to the main shaft 26 having a splined joint and with an outer shaft portion 64 slidable over an inner shaft portion 66. The universal joints 60 and 62 on the second shaft 30 are permanently attached because the second shaft 30 is not frequently removed as is the forward end of the main shaft 26.

The drive strut 32 is preferably mounted with the forward frame conduit 36 and extends downward therefrom. The drive strut 32 is mounted behind an elongated plow shoe 68, it has sides 70 extending rearward spaced at the width of the plow shoe 68. The sides 70 of the drive strut 32 are preferably shaped as shown in FIG. 4 with an elongated upright portion and a forwardly curved lower portion. The sides 70 are jointed on the forward edge and held in a parallel relation forming a three-sided enclosure. The drive strut 32 is mounted with the rod weeder 12 by attaching the drive strut 32 behind a tool bar 72 which holds a plow shoe 68. Attachment of the drive strut is preferably done by using extended bolts on the plow shoe 68 to attach the lower portion and by bolting the ears 74, which extend forward from the upper portion of the sides, to the tool bar 72.

The function of the drive strut 32 is to house the chain drive assembly which connects the second shaft 30 and the weeder rod 24. The chain drive assembly has several bearing plates 78 attached on the outside of the sides 70 which support the weeder rod 24 on the lower part of the drive strut 32 and the second shaft 30 on the upper portion. As shown in FIG. 4 the chain drive has a chain 80 connected around a sprocket 82 in the upper portion of the drive strut 32, another sprocket 84 in the lower portion and a tension adjusting sprocket 86 in the center portion. The upper sprocket 82 is connected to the second shaft 30, and the lower sprocket 84 is connected to the weeder rod 24. The weeder rod 24 passes through the center of the lower sprocket 84 and its bearing support at the axis of rotation.

As can be seen in the drawings, the drive assembly 14 is attached to the rod weeder frame 16 by several different clamps 90. With the rod weeder frame 16 so constructed of the two elongated conduits 36 and 38 the clamps 90 provide for easy mounting for the drive assembly 14. It is to be noted that the drive assembly 14 is held to the frame 16 only by the clamps 90, so the gear box 28 and drive strut 32 can be positioned any place along the frame 16 preferably where it is most convenient to connect it to the rod weeder 12. The drive strut 32 is attached to a tool bar 72; however, not all tool bars on all types or makes of rod weeders are positioned in the same place or are always used in the same place. To compensate for this the second shaft 30 is extendable. By using the extendable second shaft 30, the drive strut can be positioned at different distances from the bear box 28. Also, because of the universal joints 60 and 62 on the second shaft 30, the drive strut 32 does not have to be exactly aligned with the gear box 28 to operate properly. The gear box 28 likewise can be positioned transversely along the rod weeder frame 16 so as to align the mainshaft 26 with the power takeoff output shaft. This is an advantage because not all tractor or operator vehicles are constructed with the power takeoff output shaft in the same position. If a particular rod weeder is to be pulled by several tractor or operator vehicles, the gear box 28 can be easily positioned to align with the power takeoff shaft for the particular vehicle pulling it.

Operation of the rod weeder drive assembly 14 is relatively simple. The mainshaft 26 transmits rotational motion from the tractor or operator vehicle power takeoff to the gear box 28. The gear box 28 transmits rotational motion to the second shaft 30 which is connected to a chain drive that rotates the weeder rod 24. In actual operation the power takeoff shaft speed determines the rotational speed of the weeder rod 24 via the gear box 28 and chain drive. Obviously the speed ratio of the weeder rod 24 relative to the mainshaft 26 can be changed by altering the ratios of the gear box 28 and chain drive.

In the manufacture of the rod weeder drive assembly 14 of this invention, it is obvious that the shafts and other power transmitting components are constructed of sufficient size and strength to provide the end result of rotating the weeder rod 24.

In the use and operation of the rod weeder drive assembly 14 of this invention, it is seen that same provides a versatile structure mountable with a rod weeder implement for rotating the weeder rod 24. The rod weeder drive assembly 14 can be positioned on the rod weeder frame to align with available tool bars and for attachment to the weeder rod 24, and to align the gear box 28 with the tractor or operator vehicle's power takeoff shaft.

As will be apparent from the foregoing description of the applicant's rod weeder drive assembly, relatively versatile and easily adaptable means have been provided to drive the rod of a rod weeder directly from the power takeoff shaft of a tractor or operator vehicle. The rod weeder drive assembly is easy to use and mount on a rod weeder and can be positioned and repositioned on the rod weeder frame for use and operation.

While the invention has been described in conjunction with preferred specific embodiments thereof, it will be understood that this description is intended to illustrate and not to limit the scope of the invention, which is defined by the following claims.

I claim:

1. A drive assembly for use in combination with an implement having rod weeder means, such implement having frame means, and a plurality of earth working assemblies depending from said frame means with a rotatable weeder rod member mounted transversely therewith, comprising:
   a. a gear box means mounted on said frame means and having a main shaft connected to the power takeoff means of a powering vehicle,
   b. a second shaft means attached to said gear box means,
   c. a connecting drive means connected to said weeder rod member and to said second shaft means,
   d. a strut means attached to the rear side of one said earth working assemblies having said connecting drive means therewithin,
   e. said gear box means is mounted on a transverse support member which is transversely adjustably attached to said frame means,
   f. said main shaft means is a variable length shaft and has an inner shaft portion axially slidable inside a splindedly joined outer shaft portion and has means to attach said gear box means and means to attach the power takeoff means,
   g. said second shaft means is a variable length shaft and has an inner shaft portion axially slidable inside a splindedly joined outer shaft portion and has means to attach said gear box means and means to attach said chain drive means,
   h. said strut means is shaped on the forward edge portion thereof to conform generally to said earth working assembly and has side members extending rearward therefrom sufficient to enclose said connecting drive means between said side members with the back and bottom thereof open, the forward edge of said side members conforming in shape to one of said earth working assemblies,
   i. said gear box means has the input thereto at a right angle relative the output therefrom,
   j. said strut means adjustably secured to said earth working assembly with said second shaft variable in length to compensate for location of said strut means, and
   k. said strut means has a bearing means mounted on said side members on the upper portion thereof mounting a first sprocket member of said connecting drive means and said second shaft means, and has bearing means attached to said side members on the lower portion thereof mounting a second sprocket member of said connecting drive means and said rotatable weeder rod member, a roller chain is connected therearound said first and second sprockets, a chain tension adjusting sprocket is mounted between said side members in contact with said roller chain operable to adjust the tension of same.

\* \* \* \* \*